May 18, 1965
R. F. WOOD
3,184,617
HIGH LEVEL SAWTOOTH WAVEFORM VOLTAGE GENERATOR
Filed May 24, 1962
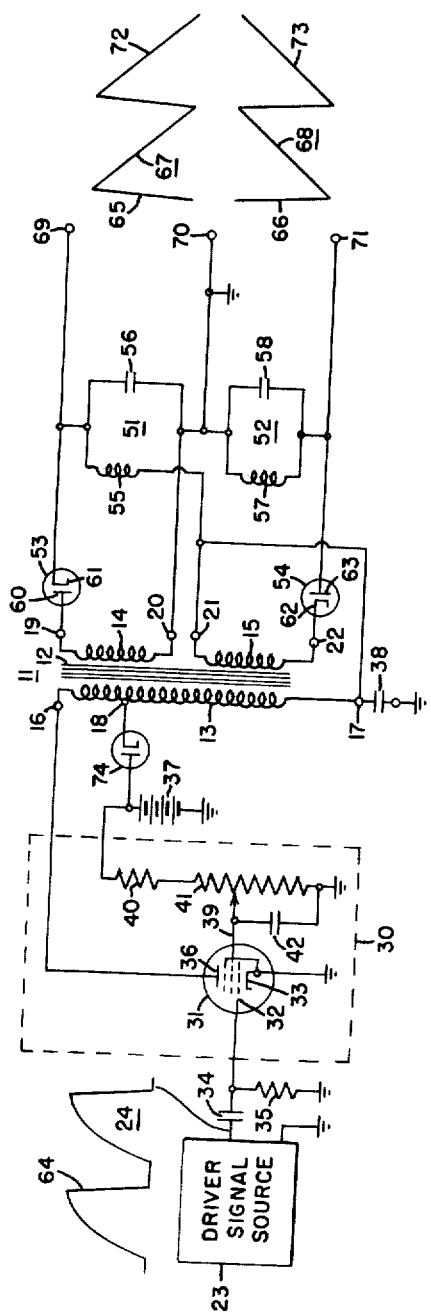
INVENTOR:
ROBERT F. WOOD,
BY Joseph Levinson
HIS ATTORNEY.

United States Patent Office 3,184,617
Patented May 18, 1965

3,184,617
HIGH LEVEL SAWTOOTH WAVEFORM VOLTAGE GENERATOR
Robert F. Wood, Baldwinsville, N.Y., assignor to General Electric Company, a corporation of New York
Filed May 24, 1962, Ser. No. 197,520
5 Claims. (Cl. 307—107)

This invention relates to an improvement in a high level sawtooth waveform voltage generator.

In co-pending application Serial No. 197,505, filed on May 24, 1962, and assigned to the assignee of the present invention, a high level sawtooth waveform voltage generator is described having an inductor and a receptive electrical network for deriving electrical energy from a periodically collapsing field of the inductor and for generating a high level sawtooth voltage waveform therefrom. The receptive network includes a parallel resonant circuit and means for intercoupling the inductor and the resonant circuit in a manner for providing a low impedance therebetween during the occurrence of the collapsing magnetic field of the inductor and a high impedance therebetween during an establishment of the magnetic field. In an embodiment of the invention described therein, there is included in the coupling means a unilateral circuit element and an RC bias circuit for reverse biasing the unilateral element during establishment of the magnetic field. Electrical energy for providing the bias voltage is derived from an electrical pulse which is generated during the occurrence of the collapsing field. The pulse establishes a charge on a capacitive element of the RC bias circuit. The capacitive element subsequently discharges through a resistive component of the RC bias circuit to maintain a direct current potential at an electrode of the unilateral element. In so discharging, the energy in the bias circuit is dissipated by heating the resistive component. This bias arrangement is less efficient than is desirable in that a relatively substantial amount of energy is dissipated in the form of heat rather than utilized in the generation of a desired output sawtooth waveform.

Accordingly, it is an object of this invention to provide an improved high level sawtooth voltage generator.

Another object of this invention is to provide a high level sawtooth voltage generator which is efficient in the utilization of electrical power.

A further object of this invention is to provide an improved bias circuit for a sawtooth generator of the type described.

In accordance with the present invention, a high level sawtooth waveform voltage generator is provided including an inductor, energizing means for causing a periodic establishment and collapse of a magnetic field of the inductor at a frequency $f_1$, and a receptive electrical network for deriving energy from the collapsing field of the inductor and for generating a sawtooth voltage waveform therefrom. The receptive network includes a parallel resonant circuit tuned to a frequency $f_2$, where $f_1 > f_2$, and a coupling means including a unilateral electrical circuit element for intercoupling the inductor and resonant circuit. Non-dissipative electrical energy storage means are provided for deriving energy from a periodic collapsing magnetic field of the inductor and for both establishing a reverse bias voltage on an electrode of the unilateral circuit element and for returning energy to the energizing circuit means during a period of time intermediate the periodic occurrence of the collapsing field.

In one embodiment of the present invention a high level balanced sawtooth waveform voltage generator is provided including an inductor comprising a transformer having a primary winding and a pair of secondary windings. Energizing means for periodically causing the establishment and collapse of a magnetic field of the inductor are coupled to the primary winding. A receptive network including a pair of resonant circuits and a pair of diodes for coupling an associated one of he resonant circuits to an associated one of the secondary windings is provided. An electrical storage element comprising a voltage boost capacitor is coupled to the primary winding of the inductor and to the receptive network for receiving and storing energy during the occurrence of the collapsing field of the inductor. The boost capacitor is connected to the energizing means via the primary winding and to electrodes of each of the diodes in the receptive network for simultaneously returning energy to the energizing means and for providing non-dissipative reverse biasing of the diodes during the establishment of the magnetic field of the inductor.

Further objects, features and the attending advantages of the invention will be apparent with reference to the following specification and drawing which is a diagram, partly in block form, of a balanced sawtooth voltage generator embodying the present invention.

Reference is now made to the drawing for an explanation of the arrangement of an illustrative embodiment of the present invention. A high level sawtooth voltage generator is shown comprising an inductor 11 having a ferrite core 12 and a primary winding 13 and a pair of secondary windings 14 and 15 wound upon the core. These windings along with winding and stray capacity, not illustrated, form an effective parallel self-resonant circuit for the inductor 11 which is discussed hereinafter. Primary winding 13 terminates at a pair of input terminals 16 and 17 and includes a tap 18 therebetween while the secondary windings 14 and 15 each terminate in a pair of output terminals 19, 20 and 21, 22 respectively.

Energizing means for causing the periodic establishment and collapse of a magnetic field of the inductor 11 includes a conventional driver signal source 23 having a periodic output waveform 24 of repetition frequency $f_1$ and an inductor driver circuit indicated generally by 30. The source 23 may consist of a free running or triggered multivibrator or may be a waveform generator of the type described in the above referred to copending application. The output waveform 24 has a repetition frequency $f_1$ on the order of a television line frequency of 15.750 kc. Driver circuit 30 includes a pentode amplifying device 31 having a pair of input electrodes comprising a control electrode 32 and a cathode electrode 33. Waveform 24 is coupled from the source 23 to the control electrode 32 via a coupling capacitor 34 and resistor 35. Amplifying pentode 31 includes an output anode electrode 36 connected to the winding 13 at terminal 16. Operating potential for the pentode is provided between cathode 33 and anode 36 by a source of direct current potential 37 of amplitude $E_1$ and a storage "boost" capacitor 38, which is connected between terminal 17 and ground potential. A means for varying the voltage on a screen electrode 39 and thereby the peak to peak amplitude of a sawtooth voltage waveform being generated in a receptive circuit, which is described hereinafter, comprises a network including a resistor 40, a potentiometer 41 and a by-pass capacitor 42.

A receptive output network for deriving energy from a collapsing field of the inductor 11 and generating a sawtooth waveform voltage comprises a pair of resonant circuits 51, 52, and an associated pair of diodes 53, 54 respectively. Each of the resonant circuits includes the parallel connected LC combination 55, 56 and 57, 58 having values selected to cause the circuits 51 and 52 to resonate at the same frequency $f_2$. The frequency $f_2$ is chosen to be substantially less than the repetition frequency $f_1$ of waveform 24. A frequency ratio $f_2/f_1 = 1/10$ provides the desired linearity in a trace segment of a waveform being generated. Diode 53 includes an anode electrode 60 connected to terminal 19 of winding 14 and a cathode electrode 61 connected to the resonant circuit 51. Diode 54 includes a cathode electrode 62 connected to a terminal 22 of winding 15 and an anode 63 connected to the resonant circuit 52.

In accordance with a feature of this invention, the storage boost capacitor 38 is coupled to the receptive circuit in a manner for deriving energy from the receptive network during collapse of a magnetic field of the inductor for increasing the efficiency of circuit operation and for causing the coupling diodes to become reverse-biased during establishment of the field thereby providing a high impedance between the resonant circuit and the inductor. To this end, an ungrounded terminal of the storage boost capacitor 38 is connected to the cathode electrode 62 of diode 54 via terminal 21 and winding 15 and to the cathode electrode 61 of diode 53 via inductance 55.

The manner in which a high level sawtooth waveform voltage is generated and the desired efficient circuit operation achieved may be generally explained as follows. As indicated previously, the inductor 11 effectively represents a parallel self resonant circuit. In a manner well known to those versed in the art, a shock excited resonant circuit will generate a damped sinusoidal voltage oscillation having a frequency equal to the resonant frequency of the excited circuit. The effective self resonant circuit of the inductor 11 is periodically shock excited by the above described energizing means to provide a periodically occurring damped sinusoidal voltage variation. Energy existing in the self-resonant circuit of inductor 11 during an alternation of a first half cycle of this voltage variation is utilized by virtue of the winding ratios of the inductor 11 to generate a high voltage retrace segment of a sawtooth output waveform in resonant circuits 51, 52 of the receptive network. A substantial amount of this same energy existing in the effective resonant circuit of the inductor 11 during the first half cycle of this sinusoidal variation is also stored by the boost capacitor 38. A damping diode 74 is provided and arranged for cooperative action with the boost capacitor for substantially damping an alternation of a second half cycle of the sinusoidal variation and for storing additional energy in the boost capacitor during the occurrence of this second half cycle alternation. Subsequent to the aforementioned first half cycle alternation, a voltage on the boost capacitor 38 back biases diodes 53 and 54 thereby permitting the resonant circuits 51 and 52 to ring and generate trace portions of an output waveform. Subsequent to the second half cycle alternation, energy is returned to the energizing means from the boost capacitor 38 thereby providing highly efficient generation of a sawtooth waveform voltage.

For a more detailed description of the operation of an embodiment of the invention, reference is again made to the drawing. As described in the above referred to co-pending application, a plate current will flow in the winding 13 substantially in accordance with the waveform 24 and generate the desired increasing and collapsing magnetic field in the inductor 11. During an increasing voltage segment of the waveform 24, an increasing magnetic field about the inductor 11 will be established. When a retrace segment 64 of the waveform 24 occurs, the field about the inductor will collapse abruptly thereby exciting the effective resonant circuit of the inductor 11 and inducing high voltage pulses in the secondary windings of the inductor. Windings 14 and 15 are wound in a manner for providing a high positive pulse at anode 60 and a high negative pulse at cathode 62. The diodes will conduct and the capacitors 56 and 58 will charge to the peak voltage of the voltage pulses to form retrace segments 65 and 66 of output waveforms 67 and 68 between the generator output terminals 69, 70 and 71.

As indicated previously, a substantial amount of the energy at the terminals of windings 14 and 15 is coupled to the storage boost capacitor 38 for increasing circuit efficiency and providing a bias voltage source. This result occurs since the boost capacitor 38 is effectively coupled in series with the resonant circuits 51 and 52 across the pulse source and since dissipative electrical parameters exist only in the resistances of the inductor windings 14, 15, the windings of inductors 55, 57 and the forward conduction resistance of diodes 53 and 54. Since the sum of these resistances is small, the receptive network is a substantially non-dissipative circuit. The energy content of the aforementioned pulses which is not dissipated in these small resistances is therefore coupled to the boost capacitor 38 for subsequent return to the energizing means to thereby greatly increase the efficiency of the circuit.

Subsequent to the occurrence of the aforementioned pulses at the output terminals of windings 14 and 15, it is desired that the circuits 51 and 52 be substantially isolated from the secondary winding by a high impedance in order that the resonant circuits may ring and generate a trace waveform. To this end, a positive D.C. voltage on the ungrounded terminal of capacitor 38 is connected to the diodes 53 and 54. The amplitudes of the above mentioned positive and negative pulses occurring at electrodes 60 and 62 are well in excess of this D.C. voltage for providing forward conduction in the diodes. In an interval intermediate the occurrence of these pulses, the D.C. voltage provided by the storage capacitor 38 maintains the diodes in a reverse biased condition to provide the desired isolating high impedance. The energy which was previously coupled to the capacitors 56 and 58 during occurrence of the pulses causes the resonant circuits 51 and 52 to ring and provide trace waveform segments 72 and 73 in the output voltage waveform.

The aforementioned pulses at the output terminals of windings 14 and 15 represent an alternation of a first half cycle of a damped sinusoidal oscillation of the effective resonant circuit of the inductor 11. Further variations are undesirable. The boost capacitor 38 together with a damper diode 74, which is connected to the tap 18 on winding 13, substantially suppress further alternations by removing energy remaining in the effective self-resonant circuit of the inductor 11 during an alternation of a second half cycle and store this energy in the boost capacitor 38. This energy in addition to energy derived from the receptive circuit during the alternation of the first half cycle, as previously explained, is returned to the driver circuit in the form of increased anode voltage $E_2$. This voltage, as hereinbefore discussed, also operates to maintain the diodes 53 and 54 reverse biased during establishment of a magnetic field about the inductor 11. Thus, a substantially non-dissipative arrangement is provided for biasing the diodes and increasing the efficiency of operation of the circuit.

While it will be understood that the construction of the inductor 11 may vary in order to satisfy individual requirements, the circuit parameters which have been found to provide satisfactory operation and are included herein only by way of example are as follows:

Core material—Ferrite standard television line frequency transformer core with an air gap between halves.
Universal winding, #32 gage wire.
The number of primary turns measured from terminal 17 to the indicated terminal are:
  Tap 18—600 turns.
  Terminal 16—700 turns.
The number of turns between terminals 19 and 20 is 180 turns. The number of turns between terminals 21 and 22 is 180.

While I have illustrated, described and pointed out in the annexed claims certain novel features of my invention, it will be understood that various omissions, substitutions and changes in the forms and details of the system illustrated may be made by those skilled in the art without departing from the spirit of the invention and the scope of the claims.

What I claim as new and desire to secure by Letters Patent of the United States is:

1. A sawtooth voltage generator comprising; an inductor having a winding; a source of electrical energy; energizing means for coupling energy from said source to said inductor winding for causing the periodic establishment and collapse of a magnetic field of said inductor; said periodically collapsing field occurring at a frequency $f_1$; a receptive electrical network including a parallel resonant circuit across which a sawtooth voltage waveform is generated, and coupling means for coupling energy from said inductor to said resonant circuit during the occurrence of said collapsing field, said resonant circuit tuned to a frequency $f_2$; said frequencies $f_1$ and $f_2$ having the relation $$f_1 > f_2$$

said coupling means including a unilateral circuit element poled for current conduction during the periodic occurrence of said collapsing field; and electrical energy storage means coupled to said inductor winding and to said receptive network for deriving energy from said collapsing field and for simultaneously reverse biasing said unilateral element and providing energy for said energizing means during the establishment of said field.

2. A sawtooth voltage generator comprising: an inductor having a winding; a source of voltage; energizing means for coupling energy from said source to said inductor for causing the periodic establishment and collapse of a magnetic field of said inductor; said energizing means including an amplifying device, means coupling said amplifying device to said winding; said periodically collapsing field occurring at a frequency $f_1$; a parallel resonant circuit across which a sawtooth voltage waveform is generated, said resonant circuit tuned to a frequency $f_2$; said frequencies $f_1$ and $f_2$ having the relation $$f_1 > f_2$$

coupling means for coupling energy from said inductor to said resonant circuit during the occurrence of said collapsing field, said coupling means including a unilateral circuit element having an electrode which is poled for current conduction during the periodic occurrence of said collapsing field; a voltage boost capacitor; a damper diode; means coupling said capacitor and said damper diode between said winding and source of voltage for deriving energy from said collapsing magnetic field during the occurrence of said collapsing field and for providing a source of voltage of increased amplitude for said amplifying device; and means coupling said capacitor to said electrode of said unilateral element for deriving energy from said collapsing field and for reverse biasing said element during the establishment of said field.

3. A generator for providing high level balanced output voltages having sawtooth waveforms comprising: a transformer having a primary winding and a pair of secondary windings; a source of direct current operating potential of amplitude $E_1$; energizing means for coupling energy from said operating potential source to said transformer for causing the periodic establishment and collapse of a magnetic field of said transformer; said collapsing field occurring at a repetition frequency $f_1$; voltage boost means for providing an operating voltage $E_2$ for said energizing means which exceeds the amplitude of said source voltage $E_1$, said voltage boost means comprising a damper diode and a boost capacitor having an output terminal; means intercoupling said damper diode, capacitor source of potential, and primary winding for providing a voltage $E_2$ at said capacitor output terminal; first and second parallel resonant circuits tuned to a frequency $f_2$; said frequencies $f_1$ and $f_2$ having the relation $$f_1 > f_2$$

first and second coupling diodes each having anode and cathode electrodes; means coupling said first resonant circuit, said first coupling diode and one of said output windings in series; means coupling said second resonant circuit, said second coupling diode and the other one of said output windings in series and means coupling the output terminal of said capacitor to the cathode electrodes of said coupling diodes.

4. A sawtooth voltage generator comprising: a transformer including a primary winding having a tap and a pair of input terminals and a secondary winding having a pair of output terminals; a resonant circuit having an inductance and a capacitance connected in parallel; a coupling diode, including a pair of electrodes, connected in series with said parallel connected inductance and capacitance; means coupling said series connected coupling diode and resonant circuit between said transformer output terminals; an electron discharge amplifying device having cathode, control and anode electrodes; a source of operating potential having positive and negative terminals; means connecting said negative terminal to said amplifying device cathode electrode; a damping diode having cathode and anode electrodes; means connecting said damping diode cathode to said primary winding tap; means connecting said positive terminal to said damping diode anode electrode; means connecting said amplifying device anode to one of said input terminals; a boost capacitor having first and second terminals; means connecting said first boost capacitor terminal to said other primary winding input terminal and to an electrode of said coupling diode; means connecting said second boost capacitor terminal to said negative terminal; a source of a periodically recurring voltage; and means coupling said recurring voltage from said source to said amplifying device control electrode.

5. A balanced sawtooth voltage generator comprising: a transformer including a primary winding having a tap and a pair of input terminals and first and second secondary windings each having a pair of output terminals; first and second resonant circuits each having an inductance and a capacitance connected in parallel; first and second coupling diodes each having two electrodes; means connecting said first coupling diode in series with said first resonant circuit; means coupling said series connected first diode and first resonant circuit between said output terminals of said first secondary winding; means connecting said second coupling diode in series with said second resonant circuit; means coupling said series connected second diode and second resonant circuit between said output terminals of said second secondary winding; an electron discharge amplifying device having cathode, control and anode electrodes; a source of operating potential having positive and negative terminals; means connecting said negative terminal to said amplifying device cathode electrode; a damping diode having cathode and anode electrodes; means connecting said damping diode cathode to said primary winding tap; means connecting said potential source of positive terminal to said damping diode anode electrode; means connecting said amplifying device anode to one of said input terminals; a boost capacitor having first and second terminals; means connecting said first boost capacitor terminal to said other primary winding input terminal and to an electrode of each of said coupling diodes; means connecting said second boost capacitor terminal to said potential source of negative terminal; a source of a periodically recurring voltage; and means coupling said recurring voltage from said source to said amplifying device control electrode.

References Cited by the Examiner

UNITED STATES PATENTS

| | | | |
|---|---|---|---|
| 2,662,198 | 12/53 | Starkes-Field | 315—27 |
| 2,869,029 | 1/59 | Dietch | 315—27 |
| 2,944,186 | 7/60 | Boekhorst et al. | 315—27 |

LLOYD McCOLLUM, *Primary Examiner.*